(12) United States Patent
Rude et al.

(10) Patent No.: US 6,226,177 B1
(45) Date of Patent: May 1, 2001

(54) FRICTION HINGE HAVING HIGH THERMAL CONDUCTIVITY

(75) Inventors: Edward T. Rude, Columbia; David A. Carpenter, Clarksville, both of MD (US)

(73) Assignee: TorqMaster, Inc., Stamford, CT (US)

( * ) Notice: Subject to any disclaimer, the term of this patent is extended or adjusted under 35 U.S.C. 154(b) by 0 days.

(21) Appl. No.: 09/328,280

(22) Filed: Jun. 8, 1999

(51) Int. Cl.[7] ........................................ G06F 1/20
(52) U.S. Cl. ..................... 361/687; 361/818; 361/700; 454/184
(58) Field of Search ........................... 361/687, 707, 361/818, 700, 681; 454/184, 353

(56) References Cited

U.S. PATENT DOCUMENTS 5,718,282 * 2/1998 Bhatia et al. ...................... 361/700
5,796,578 * 8/1998 Jones ................................. 361/683
5,975,195 * 11/1999 Lowry et al. ...................... 361/687

* cited by examiner

*Primary Examiner*—Leo P. Picard
*Assistant Examiner*—Hung Van Duong
(74) *Attorney, Agent, or Firm*—Gottlieb, Rackman & Reisman, P.C.

(57) ABSTRACT

The invention is a friction hinge assembly for a laptop computer which has a high thermal conductivity. The assembly includes a base element, a base element fixed to the base of the computer and to which an axially aligned base heat pipe is coupled. The assembly also includes a lid element fixed to the lid of the computer. The lid element has a body portion and a rotatable sleeve attached to the lid and which receives a lid heat pipe. The base and lid elements are pre-assembled selectively fastenable to one another for ease of assembly of the lid to the base, and in order to control the frictional torque produced by the hinge during operation.

22 Claims, 7 Drawing Sheets

FRICTION HINGE HAVING HIGH THERMAL CONDUCTIVITY

BACKGROUND OF THE INVENTION

Friction hinges are the usual means for connecting the lid and the base unit of laptop computers. Until recently, heat dissipation from the circuitry within laptops has been successfully managed within the base unit that ordinarily contains most of the heat generating components, principally the CPU itself. The recent use in laptops of faster processors that generate more heat requires the development of more efficient heat dissipation strategies.

The lid of a laptop, which contains the screen, has a large surface area that forms the cover. Since this outside cover surface is more or less vertically orientated while the laptop is in use, it can advantageously be used for heat dissipation. However, since the CPU is in the base, it becomes necessary to find an efficient means for transporting the heat from the base into the lid.

Heat pipes are the preferred method for moving heat efficiently. A heat pipe is, typically, a sealed copper tube containing a fluid-gas mixture. Since such a tube cannot withstand repeated bending, a single heat pipe cannot be used to connect the heat source in the base to the heat dissipation structure in the lid. Therefore, separate heat pipes are used in the base and in the lid, and a rotary joint is needed that forms a good thermal connection between them. Combining a friction hinge with a rotary thermal joint saves space and weight, both of which are scarce in laptops, and the cost can also be reduced by this combination.

The actual mounting of the lid assembly to the base assembly during manufacture of a laptop can be quite complex, involving the mechanical connection as well as the routing of a number of electrical conductors. Laptop manufacturers have asked for a thermally conductive friction hinge with subassemblies that can be mounted to the base and the lid and easily joined during the final assembly of the laptop with a minimum of loose components to be handled during that joining. Our invention provides such a thermally conductive friction hinge.

It is an object of our invention to provide a small friction hinge that requires a constant torque to rotate one side of the hinge with respect to the other, and which has high thermal conductivity between the sides of the hinge.

It is a further object of the invention to provide a thermally conductive friction hinge whose two sides can be individually preassembled into two units that can then easily be joined in a final assembly.

It is another object of our invention to provide a thermally conductive friction hinge that is separable into two subassemblies having no thermal boundary therebetween.

An additional object of our invention is to provide a friction hinge having high thermal conductivity whose two preassembled sides can be easily aligned during the final assembly operation.

An additional object of our invention is to provide a friction hinge having high thermal conductivity whose two preassembled sides can be easily joined in final assembly.

Still other objects and advantages of the invention will, in part, be obvious and, in part, be apparent from the following description.

SUMMARY OF THE INVENTION

Generally speaking, the invention is a friction hinge assembly for a laptop computer which has a high thermal conductivity. The assembly includes a base element fixed to the base of the computer and to which an axially aligned base heat pipe is thermally coupled. The assembly also includes a lid element fixed to the lid of the computer. The lid element has a body portion and a rotatable sleeve attached to the lid and which receives a lid heat pipe. The base and lid elements are pre-assembled and selectively fastenable to one another for ease of assembly of the lid to the base, and in order to control the frictional torque produced by the hinge during operation.

The invention is described and the figures depict a computer and hinge combination in which the stationary elements of the hinge are affixed to the base of the computer, and the rotatable elements move with the lid. However, these can easily be reversed within the scope of the invention, so that the major portion of the hinge moves with the lid and the sleeve and heat pipe, which rotate within the hinge, are attached to the base.

BRIEF DESCRIPTION OF THE DRAWINGS

Further understanding of our invention will become apparent upon consideration of the following detailed description, read in conjunction with the drawings, in which.

DETAILED DESCRIPTION OF THE DRAWINGS

Figure 1:
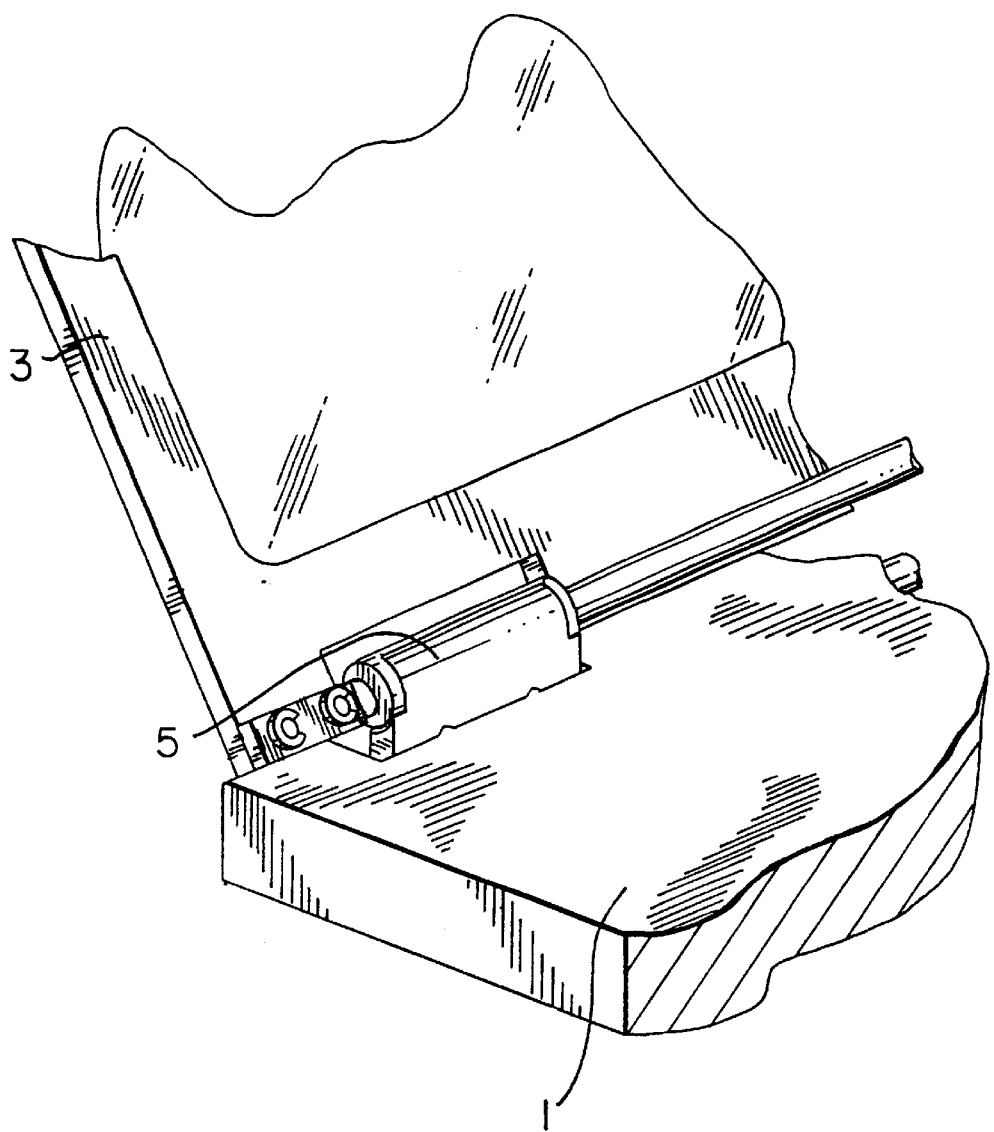
FIG. 1 is a perspective view of a corner of a notebook computer, having a base unit and a lid or screen unit joined by our inventive hinge.

Referring now to FIG. 1, the left corner of a laptop computer is shown, having base unit 1 and lid 3, which are connected by thermally conductive hinge 5. Such a laptop would also be expected to have, near the opposite corner, another friction hinge or pivoting joint to complete the necessary rotatable mechanical connection between the base and lid. In a finished laptop, the hinge and heat pipe components that are visible in FIG. 1 would be covered by portions of the plastic case.

Figure 2:
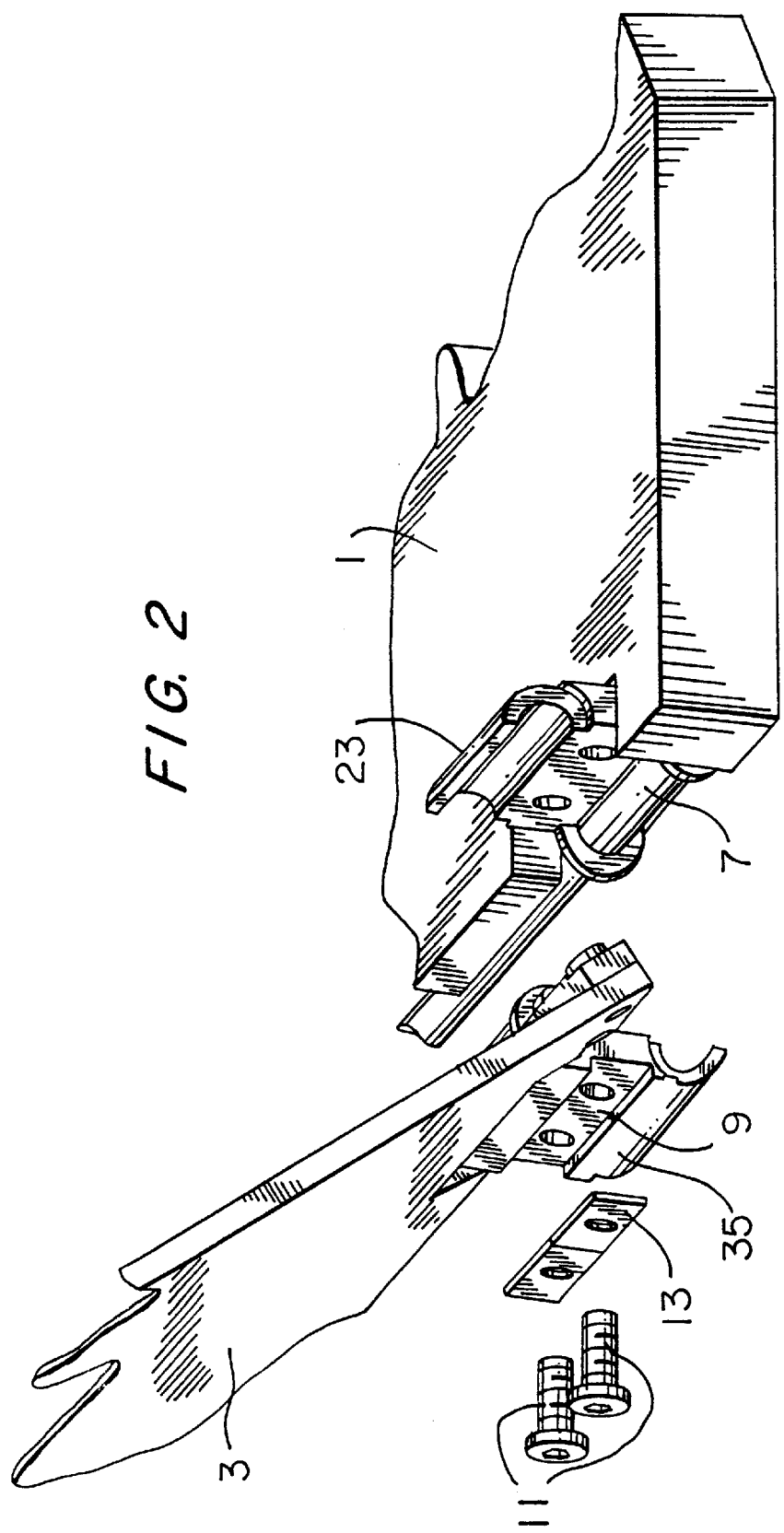
FIG. 2 is a partially exploded, perspective view of the notebook computer of FIG. 1, showing the two major subassemblies of the hinge, one attached to the base and the other attached to the lid, together with the attachment fasteners and the pressure spring.

FIG. 2 shows the same base 1 and lid 3 from the rear, the base side 7 and the lid side 9 of hinge 5 having been separated by the removal of fasteners 11 and leaf spring 13. Fasteners 11 can be screws or other fasteners of a convenient type. Leaf spring 13 is used, in combination with fasteners 11, to control the pressure exerted on the rotating frictional joint within the hinge. This combination must be designed with care to produce the desired torque characteristics of the hinge. Other means for achieving the necessary spring force within the hinge can also be used. For instance, in similar hinges having sufficient space, a stack of Belleville spring washers has been used to control the frictional torque.

Figure 3:
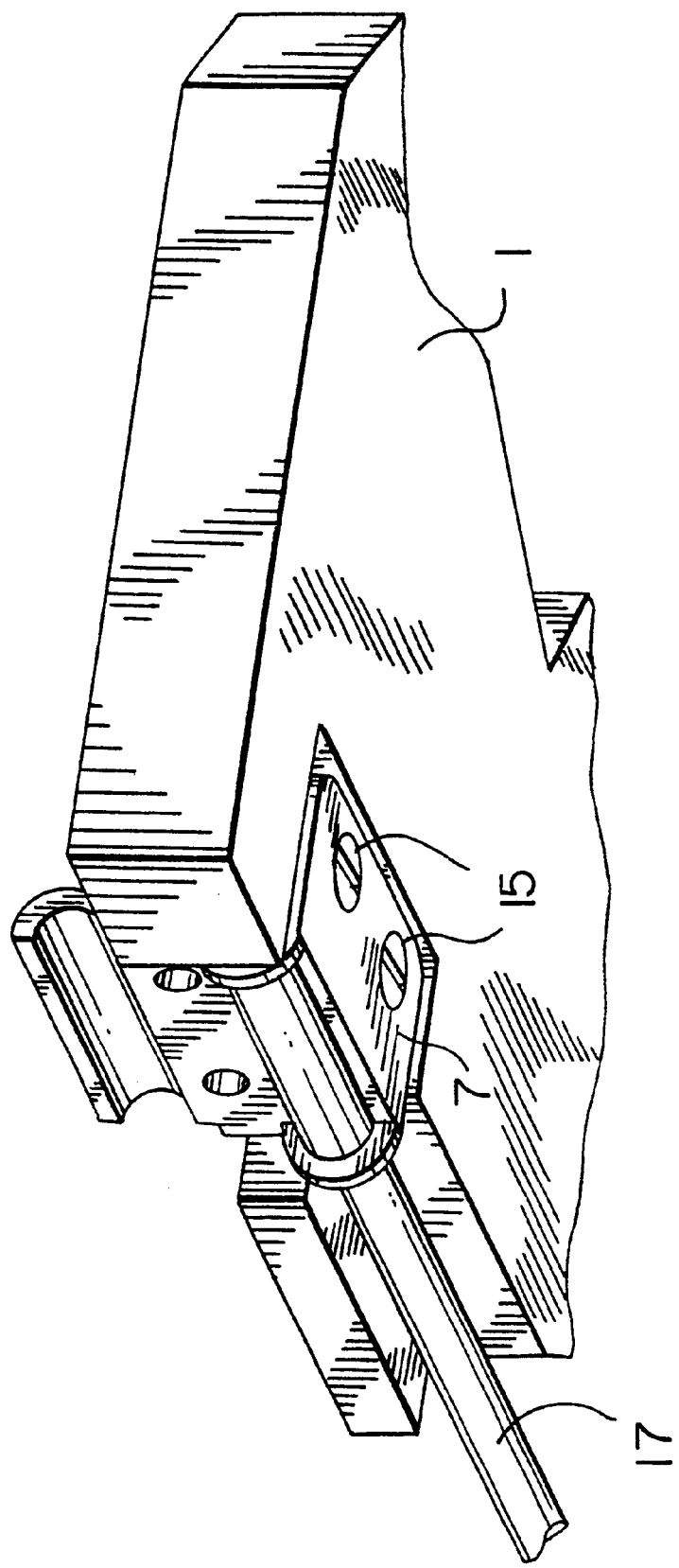
FIG. 3 is a perspective view of a corner of the base portion of the notebook computer with its side of the hinge subassembled and attached thereto.

In FIG. 3, base side 7 of hinge 5 is seen from the lower side. Base side 7 is fastened to the underside of base 1 with screws 15, or by other suitable means having sufficient mechanical strength to prevent relative movement between base 1 and base side 7 of hinge 5 when torque is applied. Base heat pipe 17 is shown protruding axially from base side 7 of hinge 5. Base heat pipe 17 is routed to the thermal cooling structure for the CPU (not shown) in order to transfer the heat produced there to base side 7 of the hinge.

Figure 4:
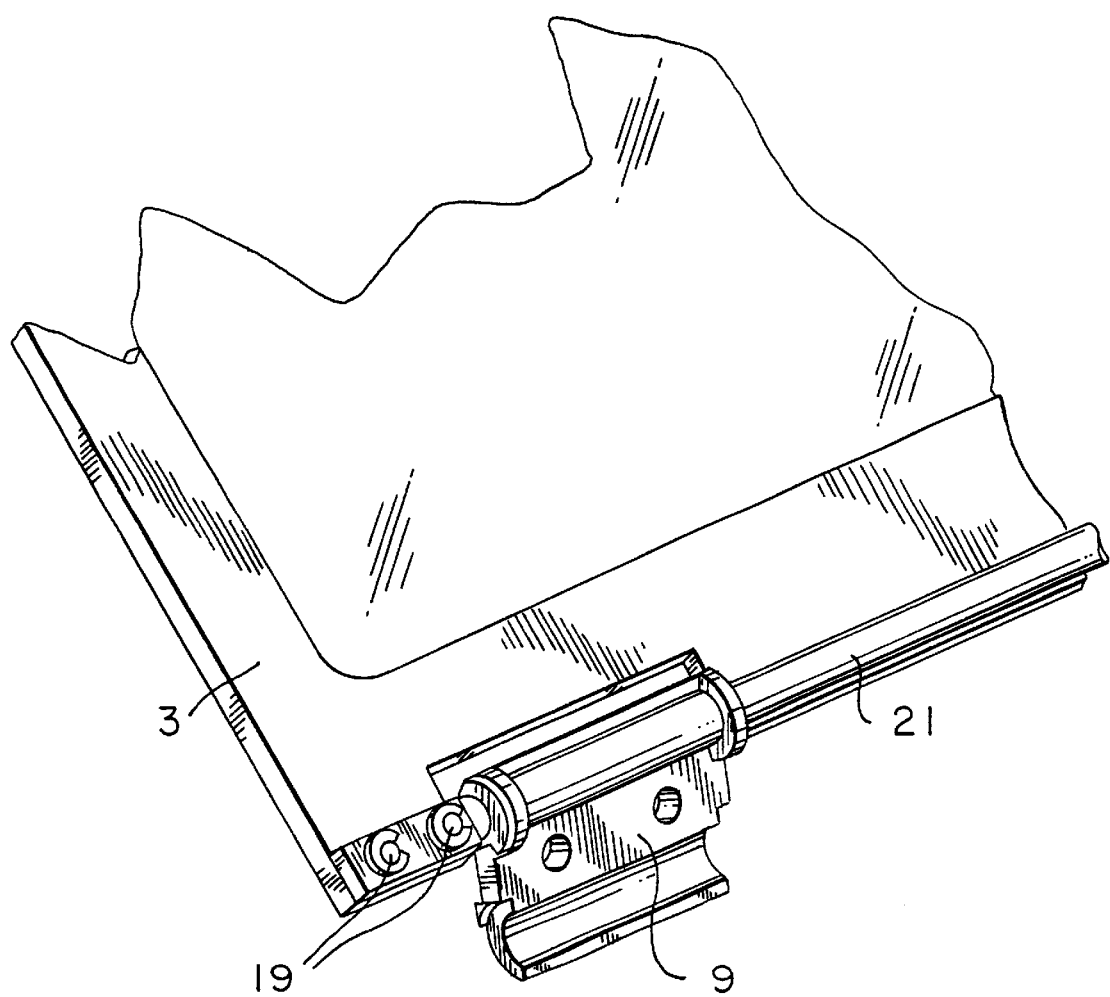
FIG. 4 is a perspective view of a corner of the lid portion of the notebook computer with its side of the hinge subassembled and attached thereto.

In FIG. 4, the attachment of lid side 9 of hinge 5 to lid 3 by screws 19 or by other means of suitable strength is shown. Lid heat pipe 21 protrudes axially from lid side 9 of hinge 5 and would be routed therefrom to a heat dissipater (not shown) built into the surface of lid 3.

Figure 5:
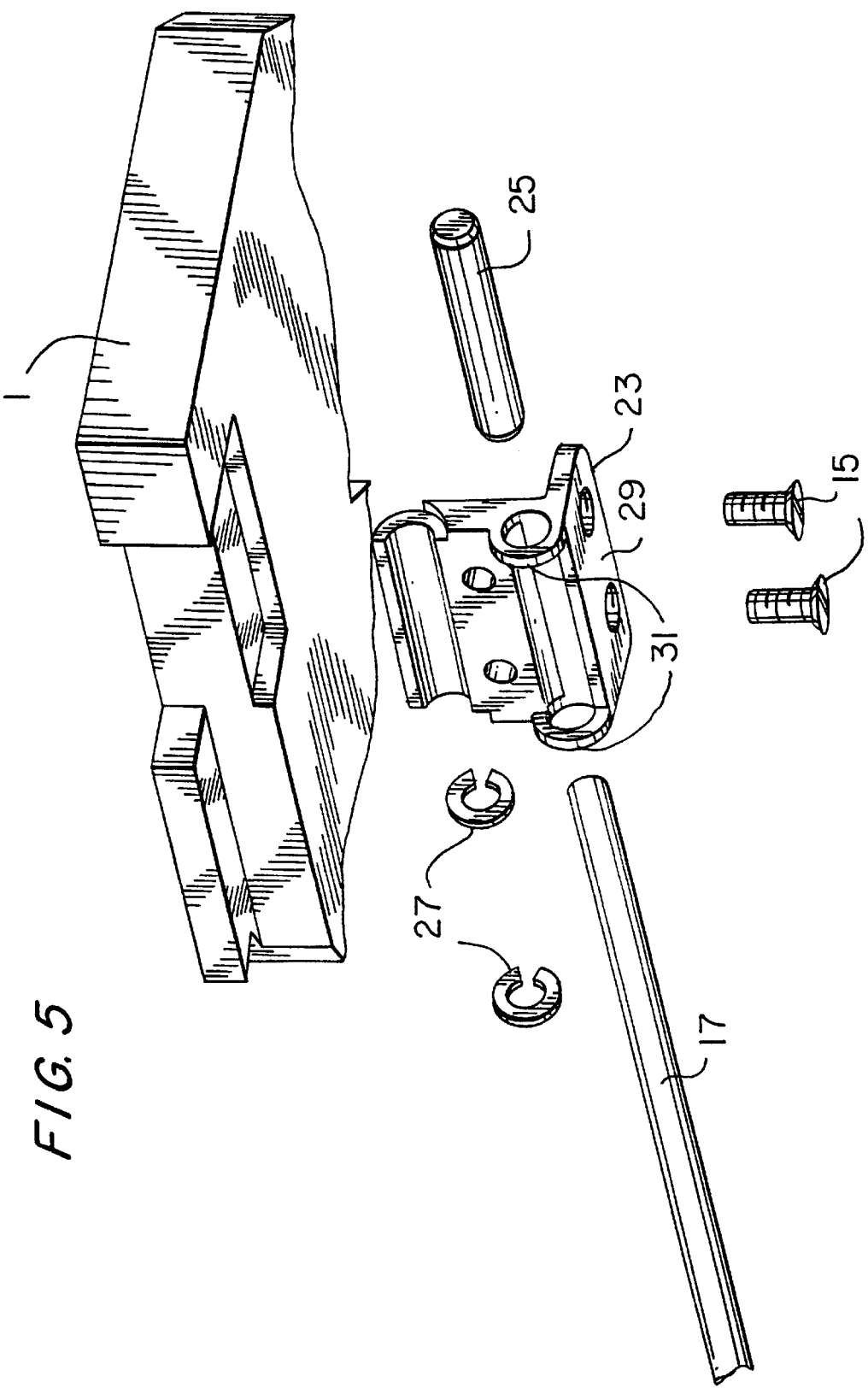
FIG. 5 is an exploded perspective view of the base side of the hinge.

FIG. 5, which is an exploded view of base side 7 of the hinge, shows that side 7 is comprised of base body 23, base sleeve 25, an end of base heat pipe 17, and lock rings 27. Base body 23 is, preferably, a die casting of a material having high thermal conductivity. Since mechanical strength is also important in this part, aluminum is a good, economical choice. The two aluminum body parts used in this hinge should be hard anodized. The hard anodize is only about one thousandth of an inch in thickness, so it adds very little in thermal resistance. This hinge also uses two sleeves to protect the ends of the heat pipes within the hinge. These tubular sleeves are made of mild steel that is case hardened after machining. Other materials having greater thermal conductivity might be used, but the thin walled steel parts add only a small increase to the total thermal resistance of the complete hinge. The hard anodize surface treatment of the aluminum parts provides good frictional characteristics in combination with the hardened steel.

Base body 23 has mounting flange 29 for attachment to base 1 of the laptop computer. The particular configuration of mounting flange 29 is of no importance to the inventive hinge so long as it provides a structurally sound mounting for base side 7 of hinge 5 to base 1 of the laptop computer. Base body 23 also has bearing ears 31 for receiving base sleeve 25. Base sleeve 25 should be a light slip fit into bearing ears 31. Base sleeve 25 has a lock ring groove at each end to receive lock rings 27 which provide axial retention of base sleeve 25 within bearing ears 31.

Still referring to FIG. 5, the end of base heat pipe 17 fits very closely within the inside diameter of base sleeve 25, wherein it is fixed, preferably with solder, thermal epoxy or some such adhesive having high thermal conductivity. The shape of base body 23 between bearing ears 31 should be semi-cylindrical, with only one or two thousandths of an inch clearance around base sleeve 25. Thermally conductive grease should fill the gap between base sleeve 25 and base body 23. When base side 7 of hinge 5 is assembled as described above and attached to base 1, it is constructed as shown in FIG. 3.

Figure 6:
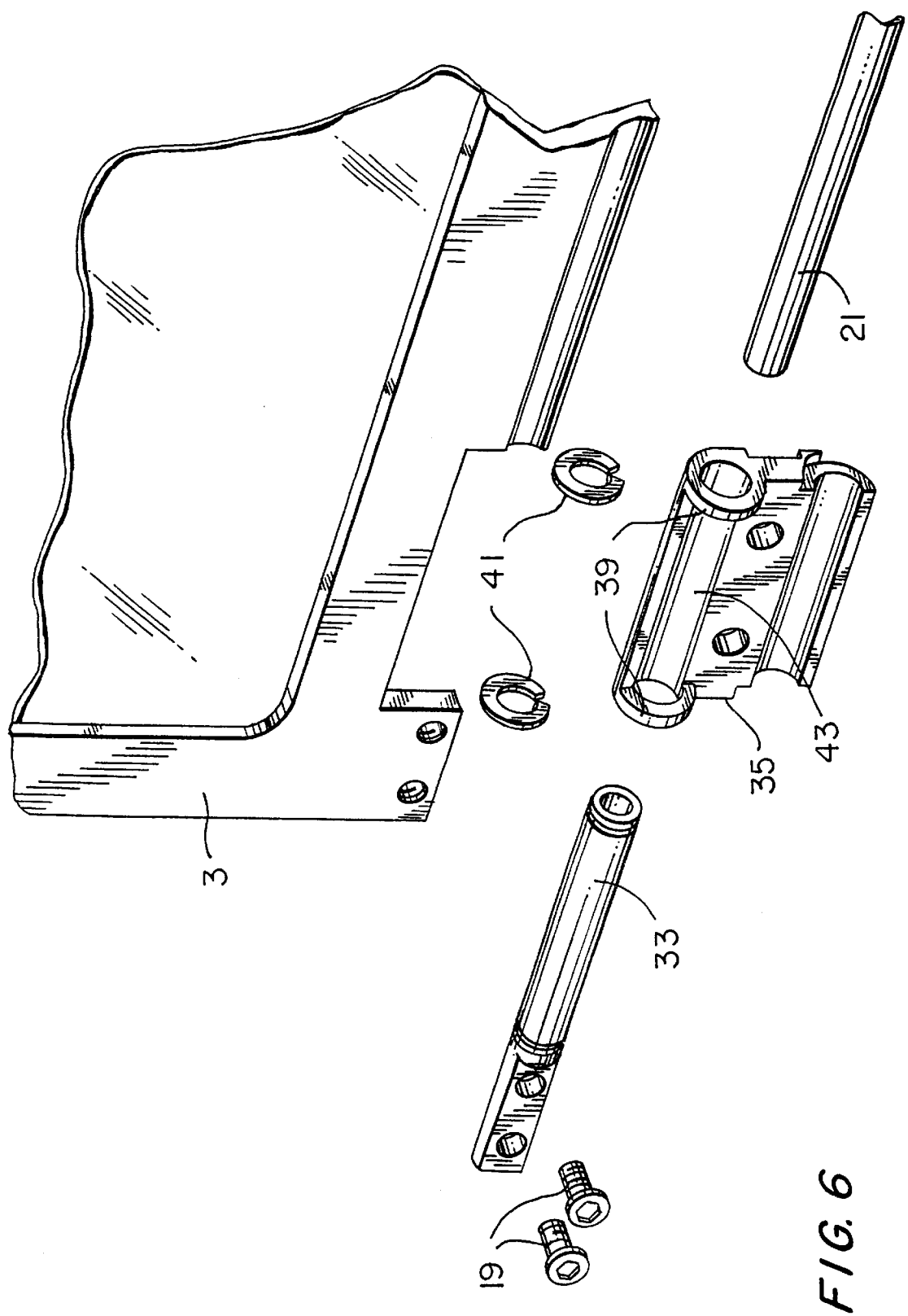
FIG. 6 is an exploded perspective view of the lid side of the hinge.

The assembly of lid side 9 of hinge 5 is similar, as shown in FIG. 6. One end of lid heat pipe 21 fits into the inside diameter of lid sleeve 33 with very little radial clearance, wherein heat pipe 21 is held with a thermal epoxy or other thermally conductive adhesive. Lid body 35 has bearing ears 39 for receiving lid sleeve 33. The fit between ears 34 and sleeve 33 should be close while permitting easy relative rotation. Lock rings 41 fit into corresponding lock-ring grooves cut into the ends of lid sleeve 33 to hold the sleeve in axial position relative to lid body 35. The surface of lid body 35 between bearing ears 39 is, again, semi-cylindrical, with an inside diameter only slightly larger than the outside diameter of lid sleeve 33. And again, during assembly, thermal grease is used to fill the gap between sleeve 33 and the lid body 35 for providing good thermal contact therebetween. This sub-assembly is completed by attaching the flattened end of lid sleeve 33 to lid 3 using fasteners 19 (see FIG. 4). Many other means for making an irrotatable connection between lid 3 and lid sleeve 33 are possible. The flattened end of sleeve 33 could fit into a molded pocket in the lid, or the end of sleeve 33 could be bent and then fastened to the lid.

With the lid and the base sub-assemblies now completed, the lid and the base can be joined together, as was seen earlier in FIGS. 1 and 2. Base body 23 and lid body 35 each have a second semi-cylindrical surface having the same inside diameter as the first. As seen in FIG. 2, when the two sides of the hinge are fitted together, these cylindrical surfaces fit over the respective sleeves on the mating side of the hinge. Fasteners 11 are inserted through leaf spring 13 and tightened to clamp the two sides of the hinge together with a force that is controlled by properties of the leaf spring. Thermal grease is used in the joint. The frictional characteristics of the hinge depend upon the clamping force and the properties of the thermal grease.

When the laptop is opened or closed, lid 3 rotates in relation to the base, and thus lid sleeve 33 rotates along with it. The parts of the base member 7, being now fastened to one another and to the base of the computer, remain stationary with respect to the base.

The thermal path from the CPU to the heat dissipation structure in lid 3 passes through base heat pipe 17 into base sleeve 25, and therefrom into the two hinge body parts 23 and 35 in substantially equal amounts. From hinge bodies 23 and 25, heat passes into lid sleeve 33, and then into lid heat pipe 21, which transports it to the heat dissipation structure in lid 3.

The thermally conductive friction hinge of our invention employs sub-assemblies that can be completed before the computer lid and base are joined. Thus, it is not necessary to manipulate small parts during final assembly when wires are in the way and space is very restricted. Prior art designs have included ones with sub-assemblies that were screwed together in final assembly, but these body parts were designed so that the separation between them was in the thermal path. The hinge of our invention uses a separation between the body parts that is parallel to the thermal path, and, therefore, introduces no additional thermal resistance.

Each of the heat pipes is fixed within a steel sleeve which is rotatable within the hinge body. One of these is to permit the lid to be operated. The other is to allow the thermal transfer assembly of the CPU to be moved without having to uninstall the heat pipe assembly from the base of the computer. This facilitates maintenance work on the computer, but it may be that it is not considered necessary. In that case, the body side of the hinge can be built without base sleeve 25. In that embodiment, base body 23 would be changed to fit closely around base heat pipe 17 for good thermal contact. This change produces a somewhat lower thermal resistance and eliminates one part, together with some assembly work, from the hinge.

Figure 7:
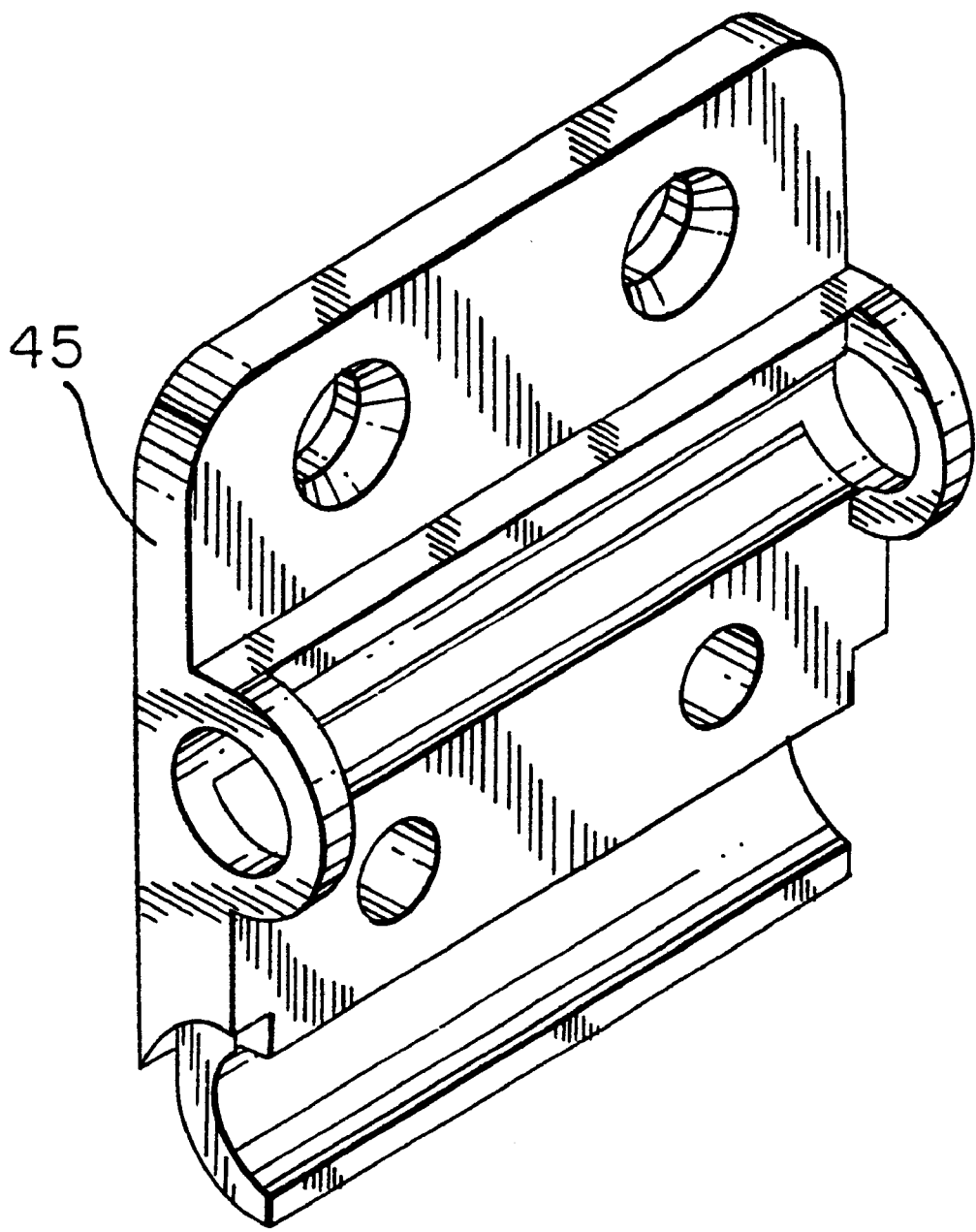
FIG. 7 is a perspective view of the body of the base side of an alternative hinge design.

In an alternative mounting of the hinge of our invention, the same parts can be arranged so that the separation between the lid body and the base body of the hinge is horizontal rather than vertical. In this arrangement, the final assembly of the hinge requires that the two parts be brought together vertically. In some situations, this arrangement may be advantageous. For such a hinge orientation, it may be inconvenient to have a mounting flange at right angles to the base body itself, as is the case with mounting flange 29 of base body 23 (see FIG. 5). In that event, the base body shown in FIG. 7 may be useful, as it has mounting flange 45, which lies in the same plane as the rest of the hinge body.

It will thus be seen that the objects set forth above, among those made apparent from the preceding description, are efficiently attained and, since certain changes may be made in the construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. For a laptop computer having a base and a lid, a friction hinge assembly having high thermal conductivity, comprising:
    a pre-assembled base element mechanically to the base of said computer and to which a base heat pipe is thermally and mechanically connected;
    a pre-assembled cooperating lid element mechanically fixed to the lid of said computer and to which a lid heat pipe is thermally and mechanically connected;
    a first fastener arranged to fasten the pre-assembled base element to the pre-assembled lid element after said base element is fixed to the base and a second fastener arranged to fasten said lid element after said lid element is fixed to the lid in order to selectively control the frictional torque provided by said hinge;
    wherein said base element and said lid element have contact surfaces and are fastened together such that (a) each element is in thermal contact with both the base heat pipe and the lid heat pipe through said contact surfaces, said contact surfaces being substantially equal, and (b) heat flow between said base pipe and said lid pipe does not travel directly between said base element and said lid element.

2. The assembly of claim 1, wherein said lid heat pipe is rotatable with respect to the lid element.

3. The assembly of claim 1, wherein said base element includes a depending heat pipe contact member sized for at least partially wrapping about the lid heat pipe and said lid element includes a depending heat pipe contact member sized for at least partially wrapping about the base heat pipe.

4. The assembly of claim 1, wherein said base element comprises a body portion with a separate sleeve disposed therein.

5. The assembly of claim 1, wherein both said base and lid elements are made of a material having a high thermal conductivity.

6. The assembly of claim 2, wherein said lid element includes a body portion with a separate sleeve rotatably disposed therein.

7. The assembly of claim 4, wherein said body portion of said base element includes a flange for attaching said base element to said base.

8. The assembly of claim 4, wherein said sleeve is axially retained in said base body portion.

9. The assembly of claim 3, wherein said lid heat pipe is fixedly received in said sleeve.

10. The assembly of claim 3, wherein said sleeve includes a flange for attachment to said lid.

11. The assembly of claim 6, wherein said sleeve is axially retained in said lid element body portion.

12. The assembly of claim 5, wherein said base and lid elements are coated with a layer of material for preventing the production of oxides.

13. A laptop computer assembly comprising:
    a base including a base heat pipe and a lid including a lid heat pipe;
    at least one friction hinge having a high thermal conductivity rotatably coupling said base to said lid and transmitting heat between said heat pipes;
    said hinge including a base element mechanically fixed to the base and being in thermal contact with said base heat pipe and said lid heat pipe;
    said hinge further including a lid element mechanically fixed to the lid and being in thermal contact with said base heat pipe and said lid heat pipe; and
    fastening members arranged to fasten the base element to the lid element in order to selectively control the frictional torque provided by said hinge.

14. The assembly of claim 13, wherein said lid element comprises a body portion with a separate sleeve rotatably disposed therein.

15. The assembly of claim 13, wherein said base element comprises a body portion with a separate sleeve disposed therein.

16. The laptop computer assembly of claim 13 said wherein at least one of said base element and said lid element comprises a body portion with a separate sleeve rotatably disposed therein in which the corresponding heat pipe is fixedly received.

17. The assembly of claim 15, wherein said body portion of said base element includes a flange for attaching said base element to said base.

18. The assembly of claim 15, wherein said sleeve is axially retained in said base body portion.

19. The assembly of claim 16, wherein said sleeve for said one of said base element and said lid element includes a flange for attaching said sleeve to either said base or said lid respectively.

20. The assembly of claim 16, wherein said sleeve is axially retained in said body portion.

21. A hinge for connecting the lid and base of a portable computer of the type having a cylindrical lid heat tube in the lid and a cylindrical base heat tube in the base, said hinge comprising:
    a lid element having a lid contact area including two substantially semicircular surfaces and an attachment member used to attach the lid element to said lid;
    a base element having a base contact area including two substantially semi-circular surfaces and an attachment member used to attach the base element to said base; and
    a fastening member used to secure said lid element and said base element to each other with each of said lid and base areas being positioned in thermal contact with both of said lid and base heat tubes through said semi-circular surfaces;
    whereby heat is transferred between said heat tubes directly through said lid and base element.

22. The hinge of claim 21 wherein said base and lid elements are arranged and constructed to be joined by said fastening member after said base and lid elements are attached to said lid and base respectively through said attachment members.

* * * * *